(12) United States Patent
Lee et al.

(10) Patent No.: US 12,433,342 B2
(45) Date of Patent: Oct. 7, 2025

(54) AEROSOL-GENERATING DEVICE

(71) Applicant: KT&G CORPORATION, Daejeon (KR)

(72) Inventors: Jongsub Lee, Sungnam-si (KR); Minkyu Kim, Seoul (KR); Jueon Park, Seoul (KR); Byungsung Cho, Gwangmyung-si (KR)

(73) Assignee: KT&G Corporation, Daejeon (KR)

( * ) Notice: Subject to any disclaimer, the term of this patent is extended or adjusted under 35 U.S.C. 154(b) by 455 days.

(21) Appl. No.: 18/017,028

(22) PCT Filed: Mar. 3, 2022

(86) PCT No.: PCT/KR2022/002969
§ 371 (c)(1),
(2) Date: Jan. 19, 2023

(87) PCT Pub. No.: WO2022/186612
PCT Pub. Date: Sep. 9, 2022

(65) Prior Publication Data
US 2023/0270175 A1  Aug. 31, 2023

(30) Foreign Application Priority Data
Mar. 5, 2021  (KR) .................. 10-2021-0029559

(51) Int. Cl.
*A24F 40/51*  (2020.01)
*A24F 40/465*  (2020.01)
(Continued)

(52) U.S. Cl.
CPC ............ *A24F 40/51* (2020.01); *A24F 40/465* (2020.01); *A24F 40/53* (2020.01); *A24F 40/57* (2020.01)

(58) Field of Classification Search
None
See application file for complete search history.

(56) References Cited

U.S. PATENT DOCUMENTS

2017/0055587 A1  3/2017  Zinovik et al.
2017/0196263 A1  7/2017  Sur
(Continued)

FOREIGN PATENT DOCUMENTS

CN  111148441  5/2020
EP  3 613 302 A1  2/2020
(Continued)

OTHER PUBLICATIONS

Korean Intellectual Property Office Application No. 10-2021-0029559, Notice of Allowance dated Sep. 13, 2023, 2 pages.
(Continued)

*Primary Examiner* — Phu H Nguyen
(74) *Attorney, Agent, or Firm* — Foley & Lardner LLP

(57) ABSTRACT

An aerosol-generating device is disclosed. The aerosol-generating device of the present disclosure includes a body having formed therein a first insertion space; a heater configured to heat the first insertion space; a sensing circuit connected to the heater; and a sensor configured to detect a change in a magnetic field of the sensing circuit, wherein the sensing circuit comprises a first part, a second part, and a third part which are each electrically conductive, wherein the first part and the second part are elongated with the third part extending between the first part and the second part to electrically connect the first part and the second part to each other, and wherein the sensor is disposed between the first part and the second part.

15 Claims, 14 Drawing Sheets

(51) Int. Cl.
*A24F 40/53* (2020.01)
*A24F 40/57* (2020.01)

(56) References Cited

U.S. PATENT DOCUMENTS

| | | |
|---|---|---|
| 2018/0156845 A1 | 6/2018 | Suzuki |
| 2020/0163384 A1 | 5/2020 | Rossoll et al. |
| 2020/0214355 A1 | 7/2020 | Lee et al. |
| 2020/0338282 A1 | 10/2020 | Trzecieski |
| 2020/0352229 A1 | 11/2020 | Lee |
| 2020/0375251 A1 | 12/2020 | Borges et al. |
| 2020/0390156 A1 | 12/2020 | An et al. |
| 2021/0015164 A1 | 1/2021 | Mizuguchi et al. |

FOREIGN PATENT DOCUMENTS

| | | |
|---|---|---|
| JP | H11-183537 | 7/1999 |
| JP | 2003-004831 | 1/2003 |
| JP | 2018-116047 | 7/2018 |
| JP | 2021-025785 | 2/2021 |
| KR | 10-2019-0138448 | 12/2019 |
| KR | 10-2020-0111579 | 9/2020 |

OTHER PUBLICATIONS

PCT International Application No. PCT/KR2022/002969, International Search Report dated Jun. 22, 2022, 2 pages.
Japan Patent Office Application No. 2023-516208, Office Action dated Apr. 30, 2024, 4 pages.
European Search Report dated Dec. 20, 2024, on European Patent appl. No. 22763593.5.

[FIG. 1]
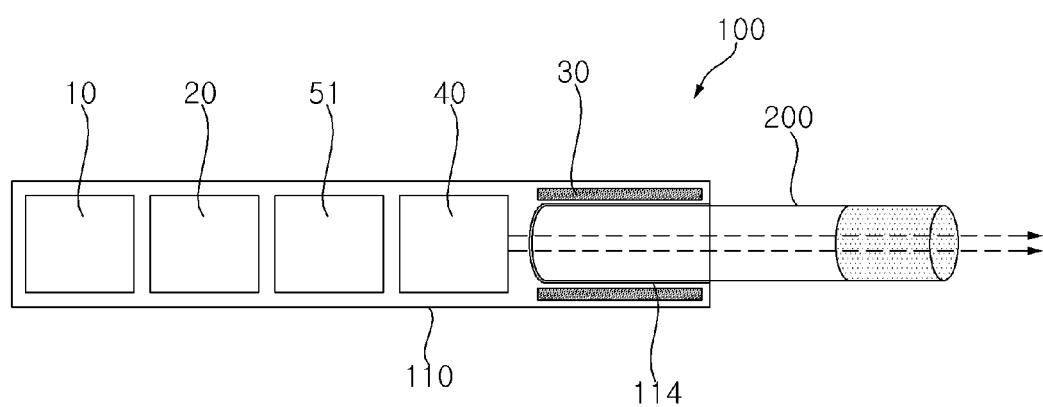

[FIG. 2]
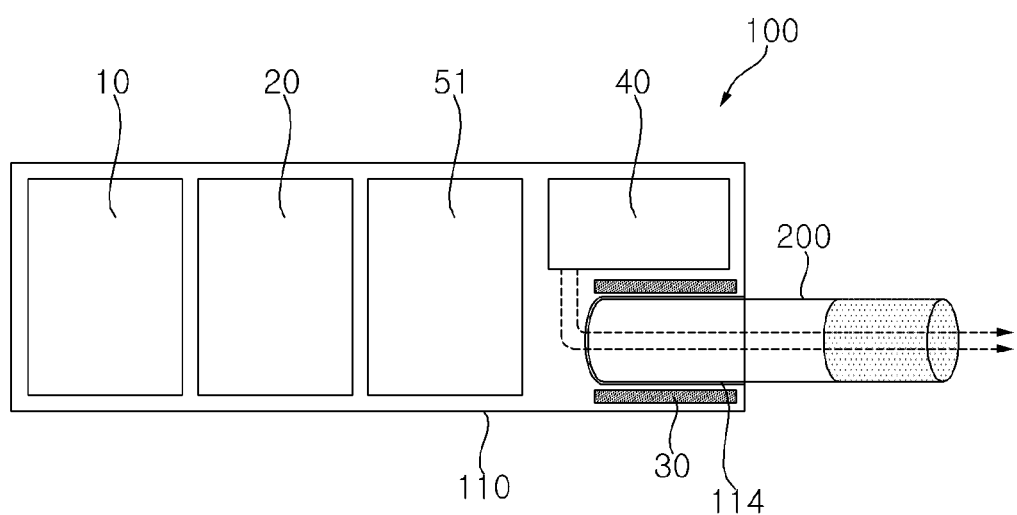

[FIG. 3]
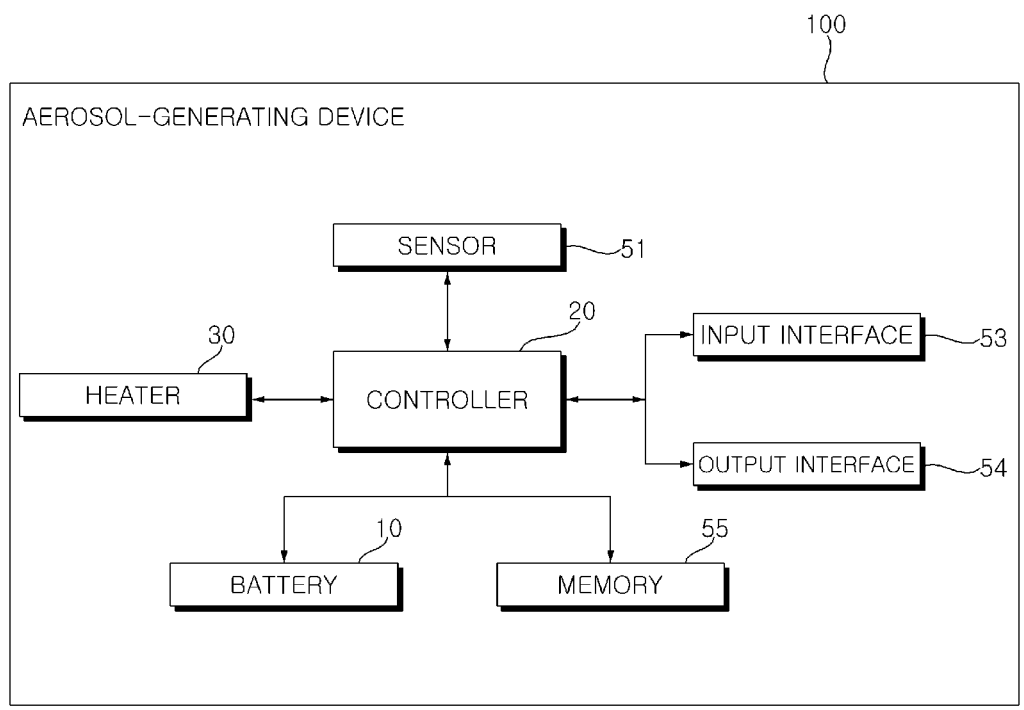

[FIG. 4]
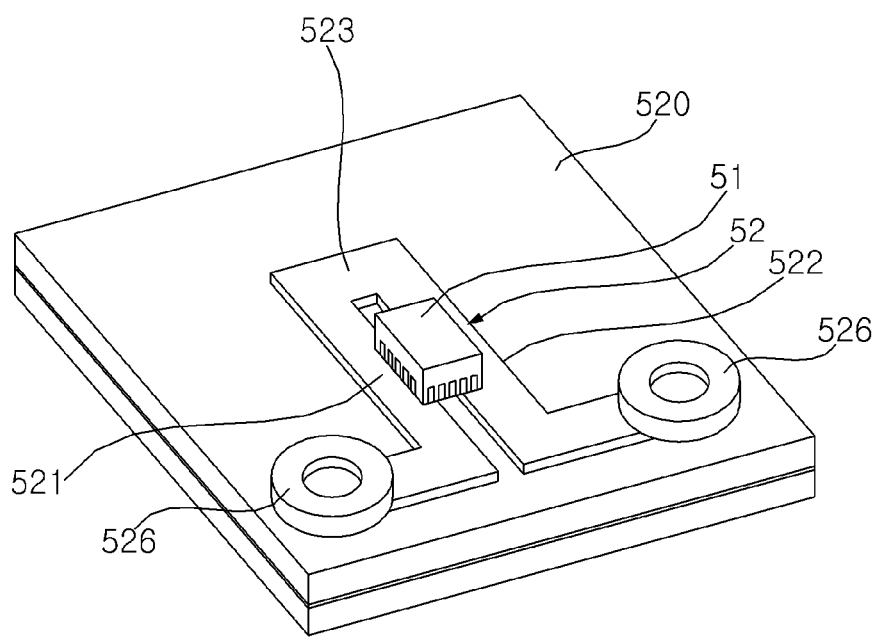

【FIG. 5】
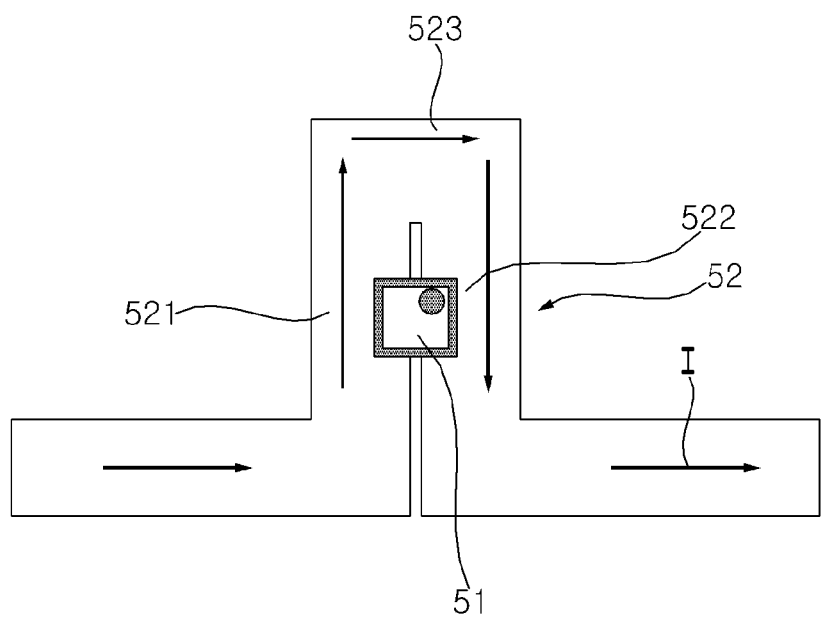

[FIG. 6]
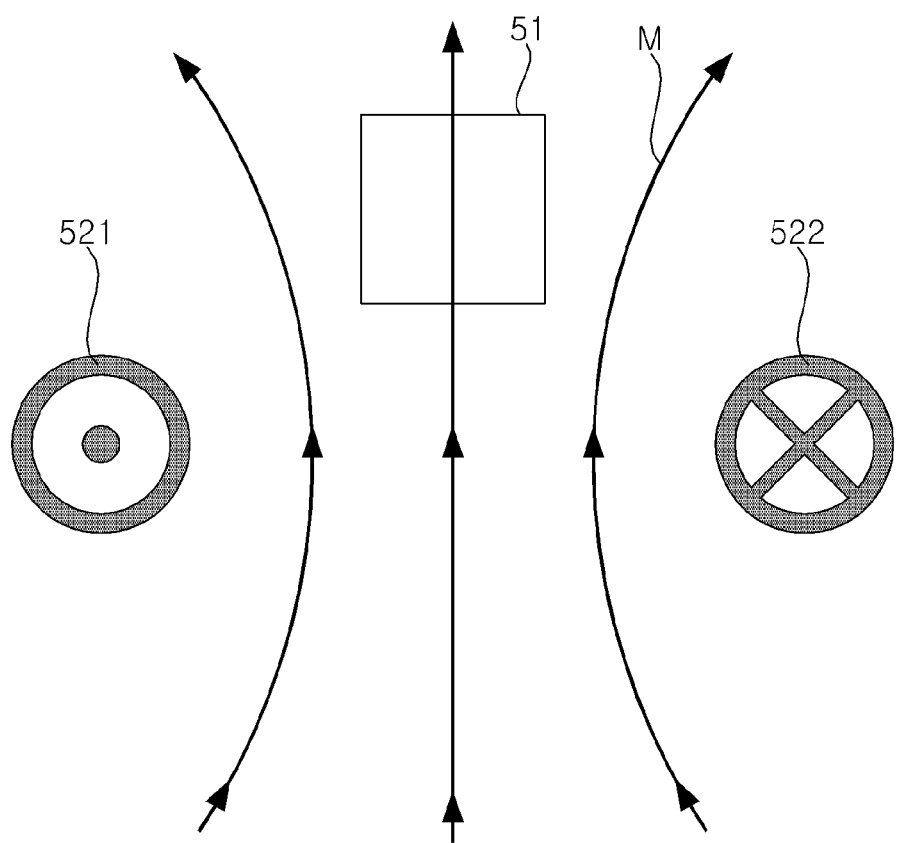

[FIG. 7]
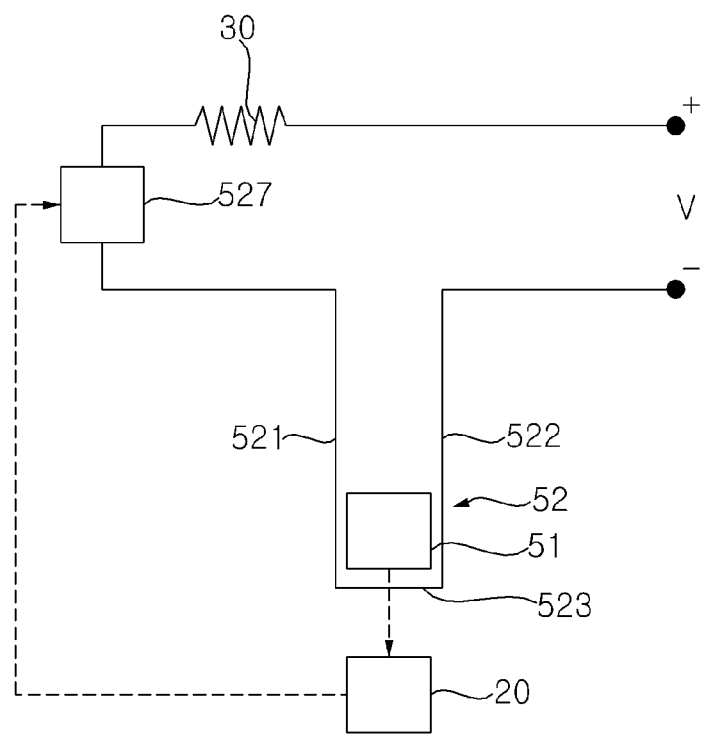

[FIG. 8]
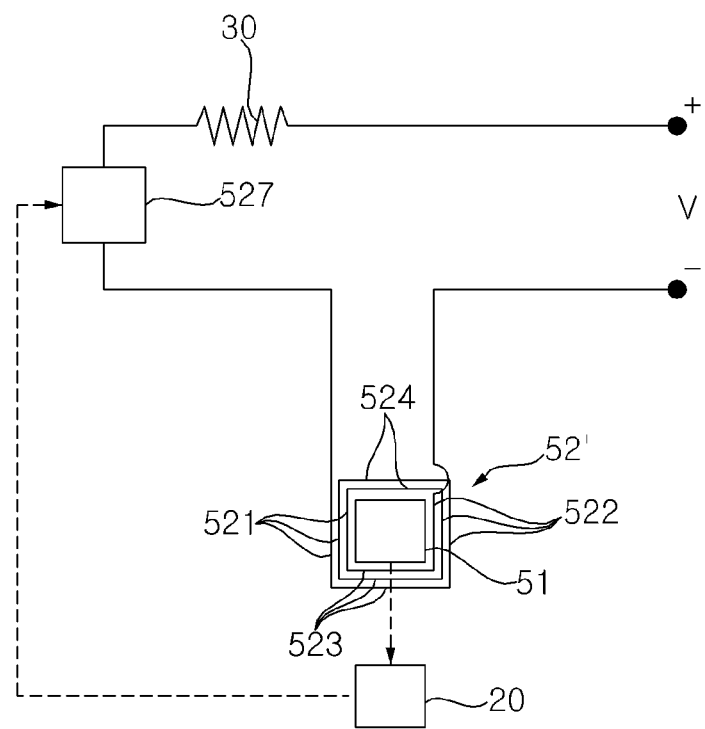

[FIG. 9]
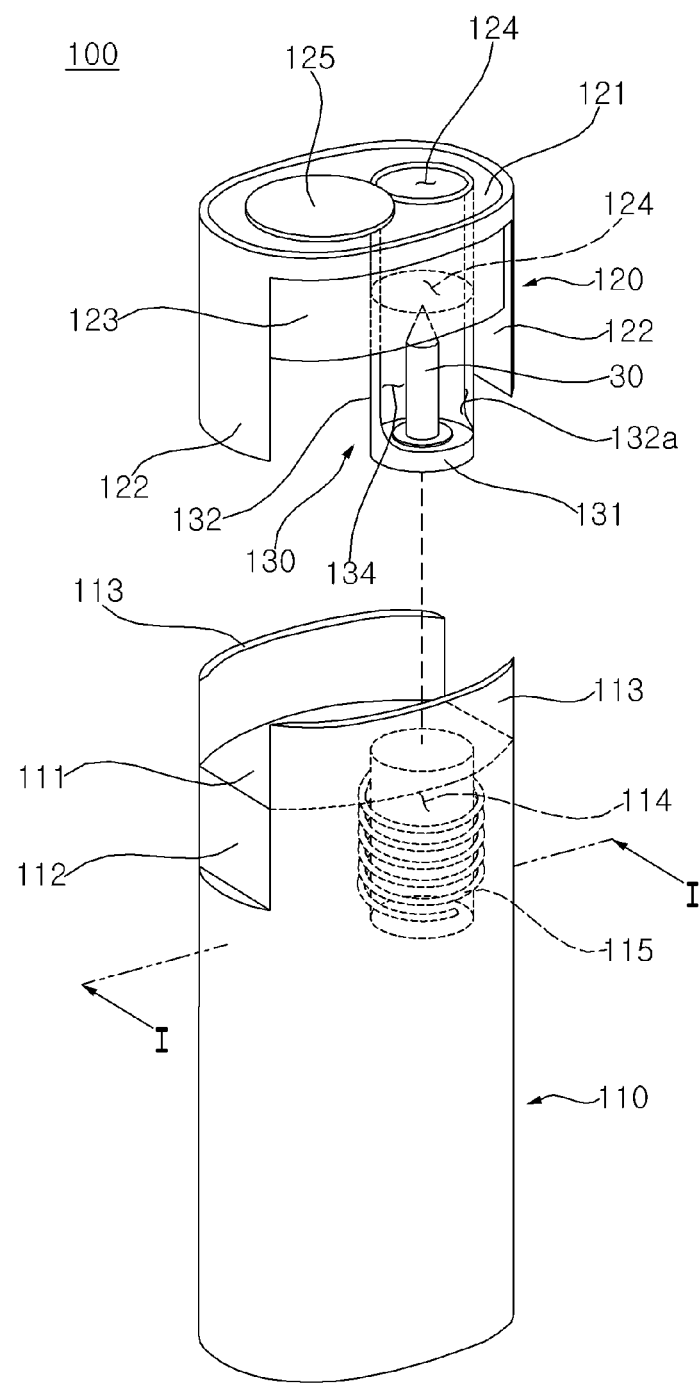

[FIG. 10]
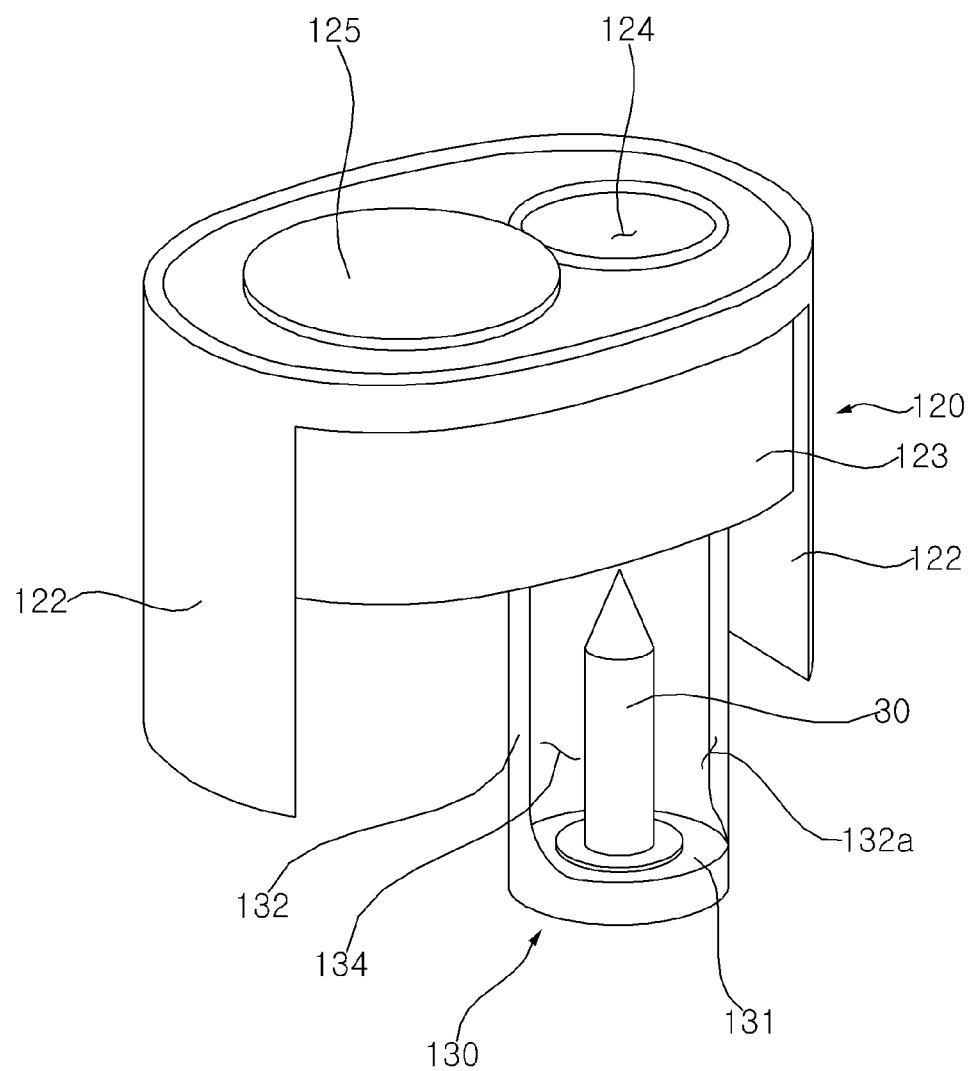

[FIG. 11]
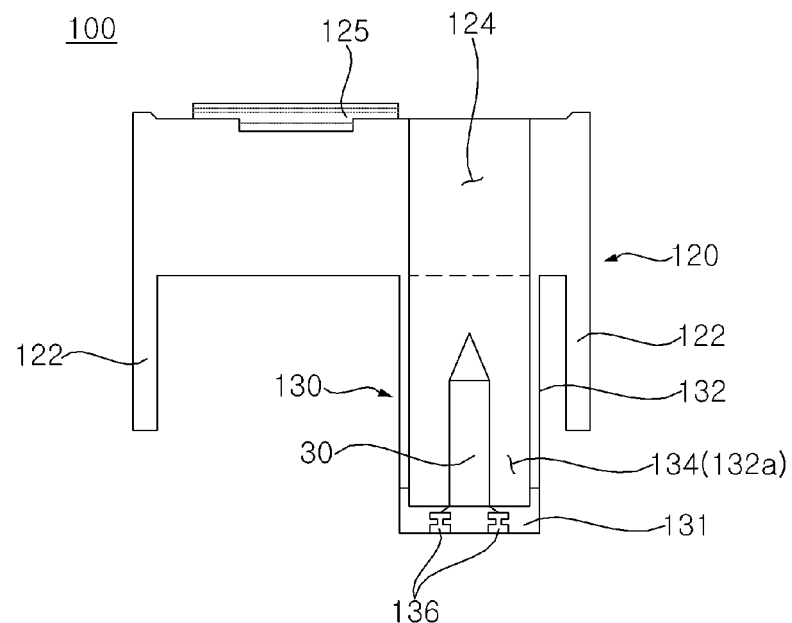
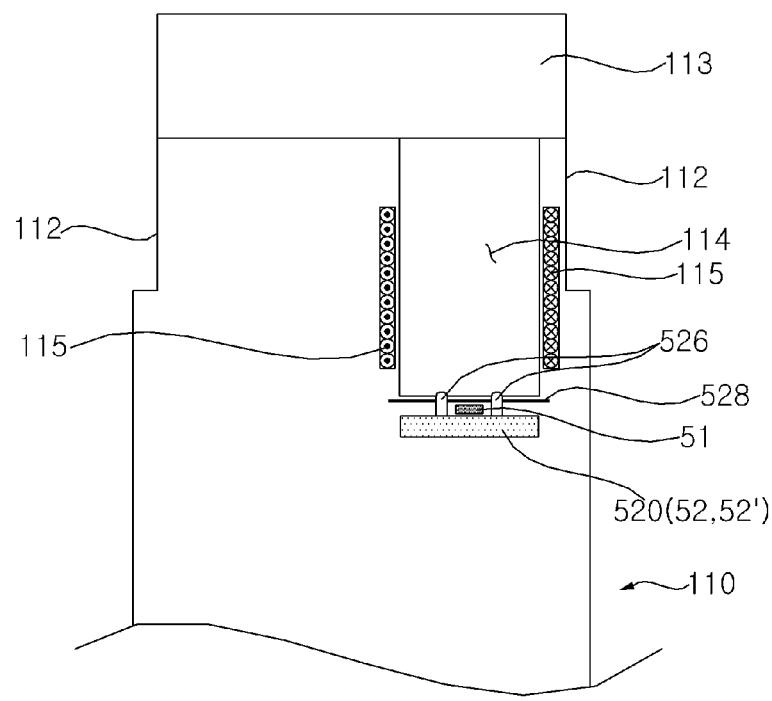

[FIG. 12]
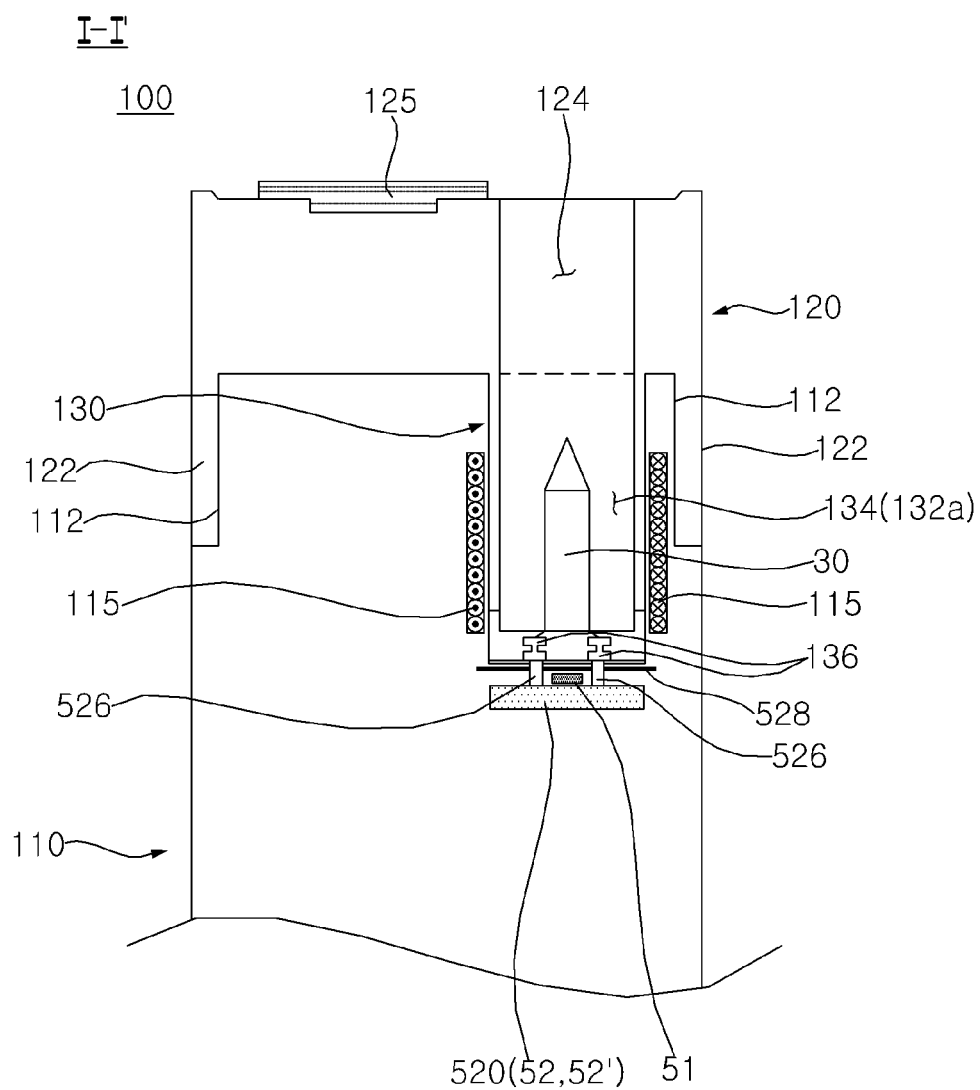

[FIG. 13]
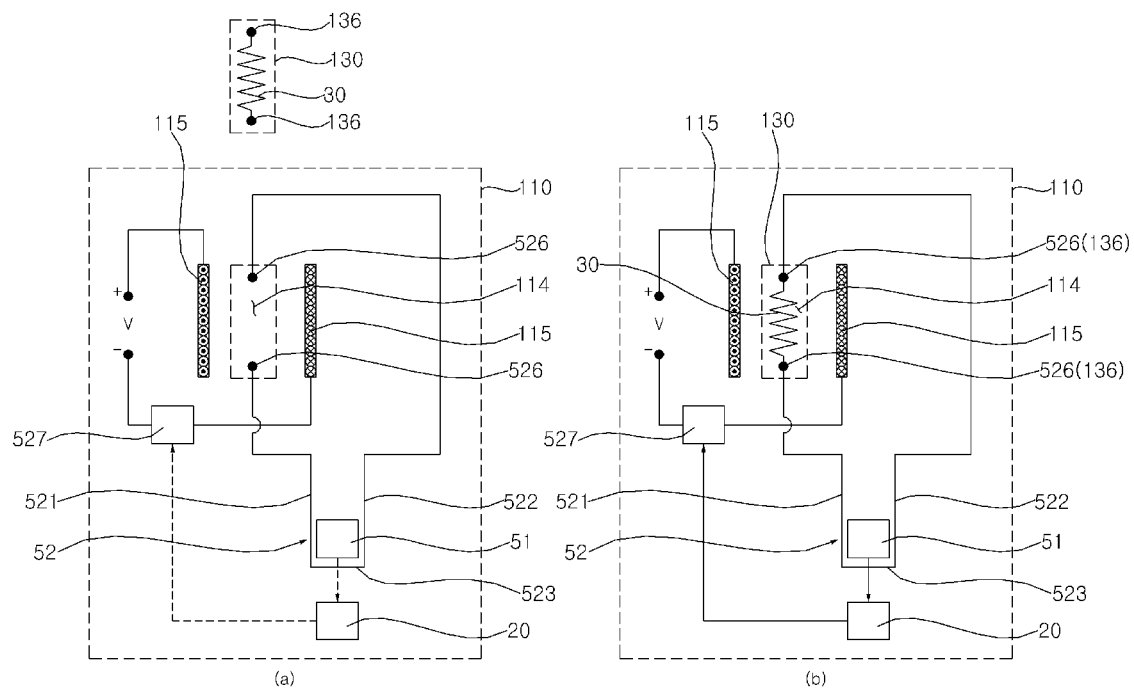

[FIG. 14]
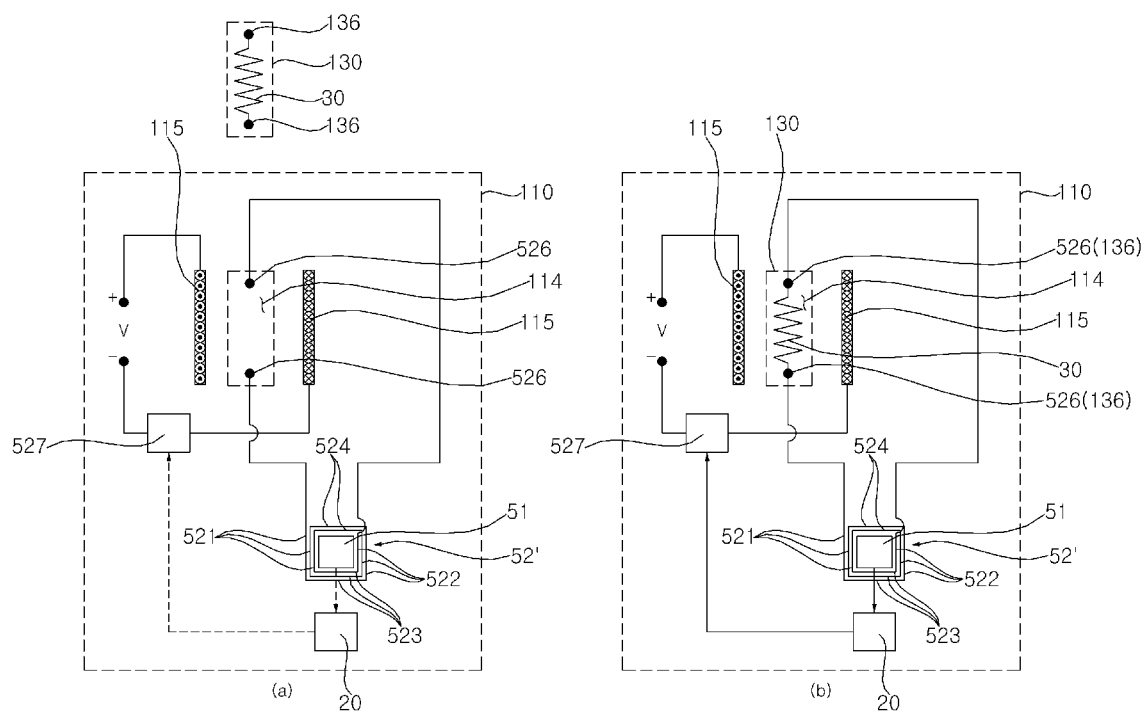

AEROSOL-GENERATING DEVICE

CROSS-REFERENCE TO RELATED APPLICATIONS

This application is the National Stage filing under 35 U.S.C. 371 of International Application No. PCT/KR2022/002969, filed on Mar. 3, 2022, which claims the benefit of earlier filing date and right of priority to Korean Application No. 10-2021-0029559, filed on Mar. 5, 2021, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted.

DISCLOSURE OF INVENTION

Technical Problem

It is an object of the present disclosure to solve the above and other problems.

It is another object of the present disclosure to provide a circuit pattern for amplifying a signal detected by a sensor for sensing the temperature of a heater.

It is still another object of the present disclosure to increase the accuracy of the sensor for sensing the temperature of the heater.

It is still another object of the present disclosure to provide a structure in which a cap, a heater, and a container containing the heater are capable of being detached from a body.

It is still another object of the present disclosure to facilitate cleaning of the heater and the container containing the heater and to prevent a device from becoming contaminated by droplets draining from a stick.

Solution to Problem

In accordance with an aspect of the present disclosure for accomplishing the above and other objects, there is provided an aerosol-generating device including a body having formed therein a first insertion space; a heater configured to heat the first insertion space; a sensing circuit connected to the heater; and a sensor configured to detect a change in a magnetic field of the sensing circuit, wherein the sensing circuit comprises a first part, a second part, and a third part which are each electrically conductive, wherein the first part and the second part are elongated with the third part extending between the first part and the second part to electrically connect the first part and the second part to each other, and wherein the sensor is disposed between the first part and the second part.

Advantageous Effects of Invention

According to at least one of embodiments of the present disclosure, a signal detected by a sensor for sensing the temperature of a heater may be amplified by a circuit pattern according to the embodiment.

According to at least one of embodiments of the present disclosure, the accuracy of the sensor for sensing the temperature of the heater may be increased.

According to at least one of embodiments of the present disclosure, a cap, a heater, and a container containing the heater may be capable of being detached from a body.

According to at least one of embodiments of the present disclosure, cleaning of the container containing the heater may be facilitated, and a device may be prevented from becoming contaminated.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which:

FIGS. 1 to 14 are views showing examples of an aerosol-generating device according to embodiments of the present disclosure.

MODE FOR THE INVENTION

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

Referring to FIGS. 1 and 2, an aerosol-generating device 100 may include at least one of a battery 10, a controller 20, a heater 30, a cartridge 40, or a sensor 51. At least one of the battery 10, the controller 20, the heater 30, the cartridge 40, or the sensor 51 may be disposed inside a body 110 of the aerosol-generating device 100.

The body 110 may be provided with a first insertion space 114. The first insertion space 114 may be formed so as to be recessed in the body 110. A stick 200 may be inserted into the first insertion space 114. The first insertion space 114, into which the stick 200 is inserted, may be formed in the vicinity of the heater 30.

Referring to FIG. 1, the battery 10, the controller 20, the sensor 51, the cartridge 40, and the heater 30 may be arranged in a row. Referring to FIG. 2, the cartridge 40 and the heater 30 may be disposed parallel to each other so as to face each other. The internal structure of the aerosol-generating device 100 is not limited to that illustrated in the drawings.

The battery 10 may supply power required to operate the components of the aerosol-generating device 100. The battery 10 may supply power to at least one of the controller 20, the heater 30, the cartridge 40, or the sensor 51. The battery 10 may supply power required to operate a display, a motor, etc. mounted in the aerosol-generating device 100.

The controller 20 may control the overall operation of the aerosol-generating device 100. The controller 20 may control the operation of at least one of the battery 10, the heater 30, the cartridge 40, or the sensor 51. The controller 20 may control the operation of the display, the motor, etc. mounted in the aerosol-generating device 100. The controller 20 may determine whether the aerosol-generating device 100 is in an operable state by checking the state of each of the components of the aerosol-generating device 100.

The heater 30 may generate heat using power supplied from the battery 10. The heater 30 may be disposed in the vicinity of the first insertion space 114. The heater 30 may heat the periphery of the first insertion space 114. The heater 30 may heat the stick 200 inserted into the aerosol-generating device 100.

The cartridge 40 may contain a liquid. The cartridge 40 may atomize the liquid to generate an aerosol. The aerosol generated by the cartridge 40 may be delivered to a user through the stick 200 inserted into the aerosol-generating device 100. The cartridge 40 may be detachably coupled to the body 110. The cartridge 40 may be omitted from the configuration of the aerosol-generating device 100.

The sensor 51 may sense the temperature of the heater 30. The sensor 51 may be disposed adjacent to the heater 30.

The controller 20 may control the temperature of the heater 30 based on the temperature of the heater 30 sensed by the sensor 51. The controller 20 may provide information about the temperature of the heater 30 to the user through a user interface based on the temperature of the heater 30 sensed by the sensor 51.

Referring to FIG. 3, the controller 20 may be electrically connected to various components. The controller 20 may control the components connected thereto.

The controller 20 may be electrically connected to an input interface 53. The user may input various commands, such as turning on or turning off of the power supply and activation or deactivation of the heater, to the input interface 53. The controller 20 may receive a command from the input interface 53 to control the operation of the components.

The controller 20 may be electrically connected to an output interface 54. The output interface 54 may provide the user with various pieces of information, such as information about on/off operation of the power supply, information about whether the heater is operating, information about the stick, information about the liquid, and information about the state of charge of the battery. The controller 20 may control the output interface 54 to provide information to the user based on various pieces of information received from the components.

The output interface 54 may include a display. The display may display information to the outside to provide the same to the user.

The output interface 54 may include a haptic output interface. The haptic output interface may provide information to the user through vibration. The haptic output interface may include a vibration motor.

The output interface 54 may include a sound output interface. The sound output interface may output a sound corresponding to information to provide the information to the user. The sound output interface may include a speaker.

The controller 20 may be electrically connected to a memory 55. The memory 55 may store therein data on information. The memory 55 may receive data on various pieces of information from the controller 20 to store the same, or may transmit stored data to the controller 20. The controller 20 may control the operation of the components based on data received from the memory 55.

Referring to FIG. 4, the aerosol-generating device 100 may include a sensing circuit 52. The sensing circuit 52 may be printed on a printed circuit board (PCB) 520. Current may flow through the sensing circuit 52. The sensing circuit 52 may include a plurality of parts 521, 522, 523, . . . , through which current flows in different directions. The sensing circuit 52 may be connected to the heater 30 (refer to FIG. 7).

The sensor 51 may detect a change in the magnetic field of the sensing circuit 52. The sensor 51 may be disposed in the vicinity of the sensing circuit 52. The sensor 51 may be disposed between the plurality of parts 521, 522, 523, . . . , through which current flows in different directions.

First contact portions 526 may be formed at respective ends of the sensing circuit 52. The first contact portions 526 may be connected to a means for providing current so that the current flows through the sensing circuit 52. For example, the first contact portions 526 may be connected to the battery 10 (refer to FIG. 3). The battery 10 may supply current to the sensing circuit 52. For example, the first contact portions 526 may be connected to second contact portions 136, which are connected to the susceptor 30 (refer to FIG. 12). When current flows through an induction coil 115, the current may flow through the heater 30 and the sensing circuit 52 due to an induced magnetic field.

The sensing circuit 52 may include at least one of a first part 521, a second part 522, or a third part 523. The first part 521, the second part 522, and the third part 523 may be electrically conductive. Current may flow in different directions through the first part 521, the second part 522, and the third part 523.

The first part 521 may be elongated. The second part 522 may be elongated. The third part 523 may extend in a direction intersecting the first part 521 and the second part 522. The third part 523 may electrically connect the first part 521 and the second part 522 to each other.

Referring to FIGS. 4 and 5, when current I flows through the sensing circuit 52, the current I may sequentially flow through the first part 521, the third part 523, and the second part 522. Alternatively, when the current I flows through the sensing circuit 52, the current I may sequentially flow through the second part 522, the third part 523, and the first part 521.

The current I may flow through the first part 521 in a first direction. The current I may flow through the second part 522 in a second direction, which intersects the first direction. The first direction and the second direction may be different directions. The first direction and the second direction, in which the current I flows, may be directions for strengthening a magnetic field formed between the first part 521 and the second part 522.

Directions that intersect a certain direction may include any direction that faces or is misaligned from the certain direction. That is, directions that intersect the certain direction may include any direction other than the same direction as the certain direction. Directions that intersect the certain direction may include any direction that is opposite the certain direction.

The first part 521 and the second part 522 may be disposed so as to face each other. The first part 521 and the second part 522 may be disposed opposite each other with respect to the sensor 51.

The first part 521 and the second part 522 may extend parallel to each other. The direction in which the current I flows through the first part 521 and the direction in which the current I flows through the second part 522 may be opposite each other. The second direction may be parallel to the first direction.

The current I may flow through the third part 523 in a third direction, which intersects the first direction and the second direction. The third direction may be different from the first direction and the second direction. The third direction in which the current I flows may be a direction for strengthening a magnetic field formed between the first part 521, the second part 522, and the third part 523. The third direction may be a direction perpendicular to the first direction. The third direction may be a direction perpendicular to the second direction.

The sensor 51 may be disposed between the first part 521 and the second part 522. The sensor 51 may be disposed between the first part 521, the second part 522, and the third part 523. The sensor 51 may overlap at least one of the first part 521 or the second part 522. The sensor 51 may overlap the third part 523.

Referring to FIGS. 5 and 6, the sensor 51 may detect a change in the magnetic field M of the sensing circuit 52. The sensor 51 may detect the magnitude and direction of the magnetic field M of the sensing circuit 52. The sensor 51 may be a magnetic sensor.

The sensor 51 may detect a change in the magnetic field M between the first part 521 and the second part 522. The sensor 51 may detect a change in the magnetic field M between the first part 521, the second part 522, and the third part 523.

When current flows through the sensing circuit 52, the direction in which the current flows through the first part 521 and the direction in which the current flows through the second part 522 may be different from each other. When current flows through the sensing circuit 52, a magnetic field M may be formed from the sensing circuit 52. When current flows through the sensing circuit 52, the magnetic field M may be strengthened between the first part 521 and the second part 522. When current flows through the sensing circuit 52, the magnetic field M may be strengthened between the first part 521, the second part 522, and the third part 523.

At least one of the first part 521, the second part 522, or the third part 523 may be formed in a plural number.

Accordingly, the magnitude of change in the magnetic field detected by the sensor 51 may be amplified. Thus, the sensitivity of the sensor 51 may be increased, and the accuracy of the sensor 51 may be improved.

Referring to FIG. 7, the sensing circuit 52 may include a first part 521 and a second part 522. The sensing circuit 52 may include a third part 523.

The sensing circuit 52 may be connected to the heater 30. The heater 30 and the sensing circuit 52 may receive power from the power supply, and current may flow through the heater 30 and the sensing circuit 52. The heater 30 may be formed of a resistive material. When current flows through the heater 30, the heater 30 may generate heat. The heater 30 may be a variable resistor, the resistance value of which changes depending on changes in the temperature of the heater 30.

As the resistance value of the heater 30 changes, the value of the current flowing through the heater 30 and the sensing circuit 52 may change. The sensor 51, which is connected to the heater 30, may detect a change in the magnetic field of the sensing circuit 52.

Current may flow through the first part 521 in the first direction. Current may flow through the second part 522 in the second direction, which intersects the first direction. The magnetic field formed by the first part 521 and the second part 522 may be strengthened between the first part 521 and the second part 522. The sensor 51 may be disposed between the first part 521 and the second part 522. The sensor 51 may be disposed adjacent to the first part 521 and the second part 522.

The third part 523 may connect the first part 521 and the second part 522 to each other. Current may flow through the third part 523 in a direction that intersects the first direction and the second direction. When current flows through the heater 30 and the sensing circuit 52, the current may sequentially flow through the first part 521, the third part 523, and the second part 522. Alternatively, when current flows through the heater 30 and the sensing circuit 52, the current may sequentially flow through the second part 522, the third part 523, and the first part 521. The magnetic field formed by the third part 523 may be strengthened between the first part 521, the second part 522, and the third part 523. The sensor 51 may be disposed between the first part 521, the second part 522, and the third part 523. The sensor 51 may be disposed adjacent to the first part 521, the second part 522, and the third part 523.

Accordingly, the magnitude of change in the magnetic field detected by the sensor 51 may be amplified. Thus, the sensitivity of the sensor 51 may be increased, and the accuracy of the sensor 51 may be improved.

The sensor 51 may be connected to the controller 20. The sensor 51 may output information about the change in the detected magnetic field, and may transmit the same to the controller 20. The controller 20 may adjust the temperature of the heater 30 based on the information about the change in the magnetic field detected by the sensor 51.

A switch 527 may be connected in series to the heater 30. The switch 527 may control the current flowing to the heater 30. The controller 20 may control the operation of the switch 527. The switch 527 may be, for example, an opening/closing switch or a transistor. However, the present disclosure is not limited to any specific type of switch 527, so long as the switch 527 is capable of controlling the current flowing to the heater 30.

Referring to FIG. 8, a sensing circuit 52' may include a first part 521, a second part 522, a third part 523, and a fourth part 524. The fourth part 524 may be electrically conductive. The fourth part 524 may be electrically connected to at least one of the first part 521 or the second part 522. The fourth part 524 may be disposed so as to face the third part 523. The fourth part 524 and the third part 523 may be disposed opposite each other with respect to the sensor 51.

Current may flow through the fourth part 524 in a fourth direction, which intersects the first direction, the second direction, and the third direction. The fourth direction may be different from the first direction, the second direction, and the third direction. The fourth direction in which current flows may be a direction for strengthening a magnetic field formed between the first part 521, the second part 522, the third part 523, and the fourth part 524.

The fourth direction may be a direction perpendicular to the first direction. The fourth direction may be a direction perpendicular to the second direction. The fourth direction may be a direction parallel to the third direction. The fourth direction may be a direction opposite the third direction.

The sensing circuit 52' may be provided in a form of being wound multiple times in one direction. The sensing circuit 52' may be wound around the sensor 51.

At least one of the first part 521, the second part 522, the third part 523, or the fourth part 524 of the sensing circuit 52' may be formed in a plural number. The sensor 51 may be disposed between the first part 521, the second part 522, the third part 523, and the fourth part 524. The sensor 51 may overlap at least one of the first part 521, the second part 522, the third part 523, or the fourth part 524.

Accordingly, the magnitude of change in the magnetic field detected by the sensor 51 may be amplified. Thus, the sensitivity of the sensor 51 may be increased, and the accuracy of the sensor 51 may be improved.

Referring to FIG. 9, the aerosol-generating device 100 may include a body 110 and a cap 120.

A first insertion space 114 may be formed by recessing the upper surface 111 of the body 110 inwards. The first insertion space 114 may be elongated in the upward-downward direction. A container 130 may be detachably inserted into the first insertion space 114.

The cap 120 may be detachably coupled to the body 110. The cap 120 and the body 110 may be coupled to each other by the attractive force between magnet devices respectively mounted in the cap 120 and the body 110. The cap 120 may cover at least a portion of the body 110 in which the first insertion space 114 is formed. The cap 120 may cover the insertion space 114 and the upper surface 111 of the body 110.

A first body sidewall 112 may form a portion of the side surface of the body 110. The first body sidewall 112 may extend downwards from the upper surface 111 of the body 110. A second body sidewall 113 may form a portion of the side surface of the body 110. The second body sidewall 113 may extend upwards from the upper surface 111 of the body 110. The first body sidewall 112 and the second body sidewall 113 may be formed in different directions.

A first cap sidewall 122 may form a portion of the side surface of the cap 120, and may extend downwards. The first cap sidewall 122 may be formed at a position corresponding to the first body sidewall 112. A second cap sidewall 123 may form a portion of the side surface of the cap 120. The second cap sidewall 123 may be formed at a position corresponding to the second body sidewall 123. The second cap sidewall 123 may be formed so as to be recessed in the inward direction of the cap 120 further than the first cap sidewall 122. The first cap sidewall 122 and the second cap sidewall 123 may be formed in different directions.

When the cap 120 is coupled to the body 110, the first cap sidewall 122 may cover the first body sidewall 112. When the cap 120 is coupled to the body 110, the second body sidewall 113 may cover the second cap sidewall 123.

Referring to FIGS. 9 and 10, a second insertion space 124 may be formed by opening a portion of the cap 120. The second insertion space 124 may have a shape that is elongated in the upward-downward direction. The second insertion space 124 may extend from an open portion in the upper surface 121 of the cap 120 to a third insertion space 134 so as to communicate with the third insertion space 134.

The cap 120 may include a cover 125, which is movably mounted thereto to open or close the second insertion space 124. The cover 125 may be mounted to the upper surface 121 of the cap 120 so as to be exposed to the outside. The cover 125 may move in a sliding manner in the vicinity of the second insertion space 124. The user may move the cover 125 to open or close the second insertion space 124.

The container 130 may be formed so as to protrude downwards from the cap 120. The container 130 may have a shape that is elongated in the upward-downward direction. The container 130 may protrude downwards further than the second cap sidewall 123.

The container 130 may be provided therein with a third insertion space 134, which communicates with the second insertion space 124. The third insertion space 134 may have a shape that is elongated in the upward-downward direction. The second insertion space 124 and the third insertion space 134 may be formed so as to be continuous. The container 130 may be formed integrally with the cap 120, or may be formed so as to be detachable from the cap 120.

The container 130 may be inserted into the first insertion space 114. When the cap 120 is coupled to the body 110, the container 130 and the third insertion space 134 may be inserted into the first insertion space 114. When the cap 120 is separated from the body 110, the container 130 and the third insertion space 134 may be separated from the first insertion space 114.

The stick 200 (refer to FIGS. 1 and 2) may be inserted into the second insertion space 124 and the third insertion space 134. When the cap 120 is separated from the body 110, the stick 200 may be separated from the body 110 together with the cap 120 and the container 130.

The container 130 may include a lower container wall 131 and a side container wall 132, which form the outer wall of the container 130. The lower container wall 131 may form the bottom of the container 130, and the side container wall 132 may form the side portion of the container 130.

The side container wall 132 may be formed to extend upwards from the periphery of the lower container wall 131 toward the cap 120. The side container wall 132 may surround at least a portion of the third insertion space 134. The side container wall 132 and the lower container wall 131 may partition the third insertion space 134. The side container wall 132 may be disposed around the periphery of the second insertion space 124. The lower container wall 131 may not be open. The lower container wall 131 may block the lower portion of the third insertion space 134.

The heater 30 may be mounted in the container 130. The heater 30 may be disposed in the third insertion space 134. The heater 30 may have a shape that is elongated in the longitudinal direction of the container 130. The upper portion of the heater 30 may have a shape that narrows at the upper end.

The induction coil 115 may be mounted around the first insertion space 114. The induction coil 115 may surround the periphery of the first insertion space 114. The induction coil 115 may be wound around the first insertion space 114 in the longitudinal direction of the first insertion space 114. When current flows through the induction coil 115 in the state in which the cap 120 is coupled to the body 110, the current may be induced in the heater 30 through the induced magnetic field, and thus the heater 30 may generate heat. The heater 30 may be a susceptor. Alternatively, in the state in which the cap 120 is coupled to the body 110, the heater 30 may be directly connected to the power supply, which is mounted in the body 110, to receive current, and may generate heat.

The heater 30 may be coupled to the lower container wall 131. The heater 30 may have a shape that is elongated upwards from the lower container wall 131. The length of the heater 30 may be less than the height of the side container wall 132.

The container 130 may have therein an opening 132a formed so as to be open in a direction that intersects the longitudinal direction of the container 130. At least a portion of the side container wall 132 may be open to form the opening 132a. The opening 132a may be open at a portion at which the first cap sidewall 122 is not formed.

The size of the opening 132a may be larger than the size of the heater 30 (refer to FIG. 11). The height of the opening 132a may be greater than the length of the heater 30. The height of the opening 132a may be equal or similar to the height of the side container wall 132. The opening 132a may communicate with the third insertion space 134. Air may be introduced into the third insertion space 134 through the opening 132a, and may flow toward the second insertion space 124.

Accordingly, the heater 30 may move integrally with the cap 120, and may thus be detached from the body 110 together with the cap 120.

Also, the heater 30 may be completely exposed to the outside through the open portion in the container 130, thus enabling the user to easily clean the heater 30 and the interior of the container 130.

Also, it is possible to prevent droplets draining from the stick 200 (refer to FIGS. 1 and 2) from entering the first insertion space 114 in the body 110.

Referring to FIGS. 11 and 12, the cap 120 may be detachably coupled to the body 110. When the cap 120 is coupled to the body 110, the container 130 may be inserted into the first insertion space 114. When the cap 120 is coupled to the body 110, the third insertion space 134 may be disposed in the first insertion space 114. The second insertion space 124 may be disposed on the first insertion space 114 and the third insertion space 134. When the cap 120 is coupled to the body 110, the heater 30 may be disposed in the first insertion space 114.

When the cap 120 is coupled to the body 110, the heater 30 may be surrounded by the induction coil 115. When current flows through the induction coil 115, an induced current may flow through the heater 30 due to the induced magnetic field, so the heater 30 may generate heat.

The sensing circuit 52 or 52' may be disposed inside the body 110. The sensing circuit 52 or 52' may be disposed adjacent to the first insertion space 114. The sensing circuit 52 or 52' may be disposed below the first insertion space 114.

The sensing circuit 52 or 52' may include a first connection portion 526, which is exposed to the first insertion space 114. The first connection portion 526 may be exposed to the lower portion of the first insertion space 114. The first connection portion 526 may be provided in a pair.

The container 130 may include second connection portions 136, which are mounted in the container 130 and are connected to the heater 30. The second connection portions 136 may be exposed to the outside of the container 130. The second connection portions 136 may face away from the container 130 toward the first insertion space 114. When the cap 120 is coupled to the body 110, the second connection portions 136 may contact the first connection portions 526, so the heater 30 and the sensing circuit 52 or 52' may be connected to each other.

When the cap 120 is coupled to the body 110, the heater 30 and the sensing circuit 52 or 52' may be connected to each other. When the cap 120 is separated from the body 110, the heater 30 and the sensing circuit 52 or 52' may be separated from each other.

Accordingly, when current flows through the heater 30, the current may also flow through the sensing circuit 52 or 52', and the sensor 51 may detect a change in the magnetic field of the sensing circuit 52 or 52' (refer to FIGS. 13(b) and 14(b)).

The sensor 51 may be disposed closer to the sensing circuit 52 than the induction coil 115. The induction coil 115 may be disposed farther away from the sensor 51 than the sensing circuit 52.

A shielding material 528 may be disposed between the induction coil 115 and the sensing circuit 52. The shielding material 528 may be disposed between the induction coil 115 and the sensor 51. The shielding material 528 may have a thin film shape. The shielding material 528 may block the magnetic field generated by the induction coil 115.

Accordingly, it is possible to prevent the sensor 51 from detecting a change in the magnetic field generated by the induction coil 115, thereby preventing malfunction of the sensor 51.

Referring to FIGS. 13 and 14, the heater 30 may be detachably connected to the sensing circuit 52 or 52'.

When the heater 30 is separated from the sensing circuit 52 or 52', current may not flow through the sensing circuit 52 or 52'. When current flows through the induction coil 115 in the state in which the heater 30 is connected to the sensing circuit 52 or 52', an induced current may flow through the heater 30 due to the induced magnetic field, and thus the current may flow through the sensing circuit 52 or 52'. When the current flows through the sensing circuit 52 or 52', the sensor 51 may detect a change in the magnetic field of the sensing circuit 52 or 52'.

Referring to FIGS. 1 to 14, an aerosol-generating device 100 in accordance with one aspect of the present disclosure may include a body 110 having formed therein a first insertion space 114, a heater 30 for heating the first insertion space 114, a sensing circuit 52 or 52' connected to the heater 30, and a sensor 51 for detecting a change in the magnetic field of the sensing circuit 52 or 52'. The sensing circuit 52 or 52' may include a first part 521, a second part 522, and a third part 523 which are each electrically conductive, wherein the first part 521 and the second part 522 are elongated with the third part 523 extending between the first part 521 and the second part 522 to electrically connect the first part 521 and the second part 522 to each other. The sensor 51 may be disposed between the first part 521 and the second part 522.

In addition, in accordance with another aspect of the present disclosure, the sensor 51 may overlap at least one of the first part 521 or the second part 522.

In addition, in accordance with another aspect of the present disclosure, the second part 522 may be disposed so as to oppose the first part 521 with respect to the sensor.

In addition, in accordance with another aspect of the present disclosure, the first part 521 and the second part 522 may extend parallel to each other.

In addition, in accordance with another aspect of the present disclosure, the sensing circuit 52' may include a fourth part 524, which is electrically conductive and electrically connected to at least one of the first part 521 or the second part 522, and The sensor 51 may be disposed between the first part 521, the second part 522, the third part 523, and the fourth part 524.

In addition, in accordance with another aspect of the present disclosure, the first part 521 may be one of a plurality of first parts or the second part 522 may be one of a plurality of second parts.

In addition, in accordance with another aspect of the present disclosure, a portion of the sensing circuit 52' may be wound around the sensor 51 multiple times.

In addition, in accordance with another aspect of the present disclosure, the aerosol-generating device 100 may further include a controller 20 configured to control the temperature of the heater 30 based on a change in the magnetic field of the sensing circuit detected by the sensor 51.

In addition, in accordance with another aspect of the present disclosure, the aerosol-generating device 100 may further include an induction coil 115 disposed adjacent to the first insertion space 114, a cap 120, which is detachably coupled to the body 110 to cover at least a portion of the body 110 at which the first insertion space 114 is formed, wherein the cap comprises: a second insertion space having an opening at an upper surface of the cap; and a container 130, extending downwardly from the cap 120 and configured to be inserted into the first insertion space when the cap is coupled to the body, wherein the container defines a third insertion space 134 formed therein which is in communication with the second insertion space 124, and is inserted into the first insertion space 114. The heater 30 may be mounted inside the container 130 and may be configured to generate heat based on operation of the induction coil 115, and wherein the heater may be detachably connected to the sensing circuit 52 or 52'.

In addition, in accordance with another aspect of the present disclosure, the sensing circuit 52 or 52' may include a first connection portion 526 disposed at the body and exposed to the first insertion space 114, and the container 130 may include a second connection portion 136 connected to the heater 30. the second connection portion 136 may contact the first connection portion 526 to connect the heater 30 to the sensing circuit 52 or 52' when the cap 120 is coupled to the body 110.

In addition, in accordance with another aspect of the present disclosure, the cap 120 may include a cover 125 thereto to open or close the opening of second insertion space 124.

In addition, in accordance with another aspect of the present disclosure, the container 130 may include a lower container wall 131 and a side container wall 132 extending upwards from the periphery of the lower container wall 131 to surround at least a portion of the third insertion space 134, and the side container wall 132 may comprises an opening 132a to expose the heater 30 therethrough.

In addition, in accordance with another aspect of the present disclosure, the opening 132a may have a size larger than the size of the heater 30.

In addition, in accordance with another aspect of the present disclosure, the lower container wall 131 may defines the lower portion of the third insertion space 134.

In addition, in accordance with another aspect of the present disclosure, the aerosol-generating device 100 may further include a shielding material 528 disposed between the induction coil 115 and the sensor 51 to block the magnetic field generated by the induction coil 115.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An aerosol-generating device comprising:
   a body having formed therein a first insertion space;
   a heater configured to heat the first insertion space;
   a sensing circuit connected to the heater; and
   a sensor configured to detect a change in a magnetic field of the sensing circuit,
   wherein the sensing circuit comprises a first part, a second part, and a third part which are each electrically conductive,
   wherein the first part and the second part are elongated with the third part extending between the first part and the second part to electrically connect the first part and the second part to each other, and
   wherein the sensor is disposed between the first part and the second part.

2. The aerosol-generating device according to claim 1, wherein the sensor overlaps at least one of the first part or the second part.

3. The aerosol-generating device according to claim 1, wherein the second part is disposed so as to oppose the first part with respect to the sensor.

4. The aerosol-generating device according to claim 3, wherein the first part and the second part extend parallel to each other.

5. The aerosol-generating device according to claim 4, wherein the sensing circuit further comprises a fourth part which is electrically conductive and electrically connected to at least one of the first part or the second part, and
wherein the sensor is disposed between the first part, the second part, the third part, and the fourth part.

6. The aerosol-generating device according to claim 1, wherein the first part is one of a plurality of first parts or the second part is one of a plurality of second parts.

7. The aerosol-generating device according to claim 1, wherein a portion of the sensing circuit is wound around the sensor multiple times.

8. The aerosol-generating device according to claim 1, further comprising:
a controller configured to control a temperature of the heater based on a change in a magnetic field of the sensing circuit detected by the sensor.

9. The aerosol-generating device according to claim 1, further comprising:
an induction coil disposed adjacent to the first insertion space;
a cap detachably coupled to the body to cover at least a portion of the body at which the first insertion space is formed, wherein the cap comprises:
a second insertion space having an opening at an upper surface of the cap; and
a container extending downwardly from the cap and configured to be inserted into the first insertion space when the cap is coupled to the body, wherein the container defines a third insertion space formed therein which is in communication with the second insertion space,
wherein the heater is mounted inside the container and is configured to generate heat based on operation of the induction coil, and
wherein the heater is detachably connected to the sensing circuit.

10. The aerosol-generating device according to claim 9, wherein the sensing circuit includes a first connection portion disposed at the body and exposed to the first insertion space,
wherein the container includes a second connection portion connected to the heater, and
wherein the second connection portion contacts the first connection portion to connect the heater to the sensing circuit when the cap is coupled to the body.

11. The aerosol-generating device according to claim 9, wherein the cap includes a cover to open or close the opening of second insertion space.

12. The aerosol-generating device according to claim 9, wherein the container includes a lower container wall and a side container wall extending upwards from a periphery of the lower container wall to surround at least a portion of the third insertion space, and
wherein the side container wall comprises an opening to expose the heater therethrough.

13. The aerosol-generating device according to claim 12, wherein the opening has a size larger than a size of the heater.

14. The aerosol-generating device according to claim 12, wherein the lower container wall defines a lower portion of the third insertion space.

15. The aerosol-generating device according to claim 9, further comprising:
a shielding material disposed between the induction coil and the sensor to block a magnetic field generated by the induction coil.

* * * * *